(12) United States Patent
Diemeer et al.

(10) Patent No.: US 6,870,998 B2
(45) Date of Patent: Mar. 22, 2005

(54) VARIABLE OPTICAL ATTENUATOR

(75) Inventors: Mart Diemeer, Hummelo (NL); Peter Edwin Sportel, Nepean (CA)

(73) Assignees: JDS Uniphase Corporation, San Jose, CA (US); JDS Uniphase Inc., Ottawa (CA)

( * ) Notice: Subject to any disclaimer, the term of this patent is extended or adjusted under 35 U.S.C. 154(b) by 216 days.

(21) Appl. No.: 10/132,105

(22) Filed: Apr. 25, 2002

(65) Prior Publication Data

US 2002/0176687 A1 Nov. 28, 2002

Related U.S. Application Data

(60) Provisional application No. 60/286,338, filed on Apr. 26, 2001.

(51) Int. Cl.[7] ................................................. G02B 6/26
(52) U.S. Cl. ......................................... 385/140; 385/39
(58) Field of Search .............................. 385/1, 2, 8, 11, 385/39, 40, 43, 129–132, 140

(56) References Cited

U.S. PATENT DOCUMENTS

| | | |
|---|---|---|
| 4,557,557 A | 12/1985 | Gleason et al. |
| 5,050,956 A | 9/1991 | Carpenter et al. |
| 5,546,480 A | 8/1996 | Leonard ........................ 385/3 |
| 5,854,864 A | 12/1998 | Knoesen et al. .............. 385/30 |
| 6,208,798 B1 | 3/2001 | Morozov et al. ........... 385/140 |
| 6,311,004 B1 * | 10/2001 | Kenney et al. ............. 385/130 |
| 6,356,692 B1 * | 3/2002 | Ido et al. .................... 385/129 |
| 6,370,312 B1 | 4/2002 | Wagoner et al. |
| 6,400,885 B1 * | 6/2002 | Hu et al. .................... 385/140 |
| 2001/0046363 A1 * | 11/2001 | Purchase et al. ............ 385/140 |

OTHER PUBLICATIONS

Jin et al. Polymeric Tunable Optical Attenuator for Power Regulator in WDM System, Lasers and Electro–Optics, 1999. CLEO/Pacific Rim '99. The Pacific Rim Conference on , vol.: 2 , Aug. 30–Sep. 3, 1999 pp:264–265 vol.2.*
"Variable Optical Attenuator with Large Dynamic Range and Low Drive Power" Kowalczyk et al., Optical Fiber Communication Conference and Exhibit, 2001, OFC 2001, vol. 3, 2001, pp. wr5–1–4.
"Variable Optical Attenuator Based on a Cutoff Modulator with Tapered Waveguides in Polymers" Lee et al. Journal of Lightwave Technology, vol. 17, No. 12, Dec. 1999.
"Thermo–optically active polymeric photonic components" Eldada et al. OFC 2000 pp. WH1–1 124–126.

* cited by examiner

*Primary Examiner*—John D. Lee
*Assistant Examiner*—Sarah Song
(74) *Attorney, Agent, or Firm*—Allen, Dyer, Doppelt Milbrath & Gilchrist, P.A.

(57) ABSTRACT

The invention provides a variable optical attenuator or array with low PDL by using an embedded polymer channel waveguide with a plurality of resistive heaters fabricated on the top cladding of the polymer waveguide. The resistive heaters create a strong thermal gradient in the polymer layer stack which is associated with a strong refractive index gradient with the lowest refractive index under the heater. This refractive index gradient causes the optical mode in the channel to shift towards the buffer layer. Attenuation is induced by transition losses between heated and unheated regions in the polymer waveguide when an optical signal passes through these regions of the polymer waveguide.

21 Claims, 22 Drawing Sheets

VARIABLE OPTICAL ATTENUATOR

CROSS-REFERENCE TO RELATED APPLICATIONS

This application claims priority of provisional U.S. Patent Application Ser. No. 60/286,338, filed Apr. 26, 2001, entitled "POLYMERIC WAVEGUIDE VARIABLE OPTICAL ATTENUATOR ARRAYS" which is incorporated herein by reference for all purposes.

MICROFICHE APPENDIX

Not Applicable

FIELD OF THE INVENTION

The present invention generally relates to the field of optical attenuators and in particular to the field of variable optical attenuators.

BACKGROUND OF THE INVENTION

In many fiber optic networks, optical attenuators are used to reduce energy levels in the transmission of light from a transmitting station to a receiving station. Variable optical attenuators (VOAs) play an important role in the implementation of modern information networks having optical interconnects. For example, VOAs are used for gain control of optical amplifiers in wavelength division multiplexed (WDM) networks, for dynamic channel power regulation and equalization in cross-connected nodes, channel blanking for network monitoring, and signal attenuation to prevent detector saturation. Several methods of attenuating optical signals have been reported.

Conventional variable optical attenuators have featured several types of architectures, including the use of a lossy fusion splice (see U.S. Pat. No. 4,557,557) and those that vary the distance from one optical fiber end-face to the end-face of an opposed optical fiber (see U.S. Pat. No. 5,050,956). More recently, an attenuator has been developed by Molecular OptoElectronics Corp. (U.S. Pat. No. 6,370,312) that allows electronic control of the attenuation by controlling the temperature of a control layer with an index of refraction that varies with temperature using the fiber side polishing technique. Several other methods of attenuating optical signals have been reported, such as cladding index modified methods, interferometric methods, actuated fiber displacement methods, light blocking methods, and absorbing glass methods in a variety of materials including polymer, glass, liquid crystal, and free space.

With an increasing complexity of WDM optical networks comes an increasing need for reliable, low cost VOAs that adjust the power level of optical signals with high accuracy and repeatability.

A demand for optical components that meet economic criteria as well as technical requirements has brought about the development of novel technologies that exhibit low-cost high-yield fast-turnaround manufacturing without sacrificing high performance, such as the development of advanced polymer techniques. Recently, polymeric waveguide devices have gained interest because their material properties, e.g. refractive index, glass transition temperature, thermo-optic coefficient, can be tuned and optimized for a desired application, compatibility with planar processing, low cost, and ease of integration with other optical and electronic components.

An important difference between polymeric materials and more conventional optical materials, such as glass, is that their refractive index varies differently with temperature. This difference is a high negative thermo-optic coefficient $dn/dT$ in combination with a low thermal conductivity. The thermo-optic coefficient is approximately an order of magnitude larger in most polymers than in glass, and can be leveraged to produce efficient thermo-optically active optical components.

It is an object of this invention to provide an improved VOA and VOA array.

Another object of this invention is to provide improved VOAs and/or arrays with low PDL.

SUMMARY OF THE INVENTION

In accordance with the present invention there is provided a variable optical attenuator comprising a substrate, a polymeric waveguide having a core surrounded by a cladding, the waveguide being supported on the substrate, and at least two refractive index varying means disposed in-line and spaced apart on an external surface of the waveguide along a propagation direction of an optical signal passing through the waveguide for generating a substantially localized refractive index gradient such that the optical signal propagating through the waveguide passes through a plurality of substantially localized varying refractive index regions for generating a transition loss to attenuate the optical signal by causing a shift of a mode field of the optical signal.

In accordance with an embodiment of the invention, a difference of the refractive index gradient is responsive to a variable control parameter of the at least two refractive index varying means and further comprising control means for selectively applying the control parameter. Such a control parameter, for example, is a voltage supplied to the at least two refractive index varying means to vary the attenuation according to a predetermined value.

In another embodiment of the present invention, the refractive index varying means are temperature varying means for generating a substantially localized temperature gradient to produce the substantially localized refractive index gradient. The temperature varying means are heating means and/or cooling means. In accordance with an embodiment of the present invention, the substrate is a heat absorbing material.

In a further embodiment of the present invention, the VOA includes a sensor for sensing a temperature of the waveguide and a temperature controller for controlling the temperature varying means in dependence upon the sensed temperature of the waveguide.

In another embodiment of the invention, the variable optical attenuator further includes a tap and feedback circuit in communication with the refractive index varying means for monitoring and/or controlling an attenuation of the variable optical attenuator.

In accordance with a further aspect of the invention, the temperature varying means of the VOA comprises asymmetric temperature varying means for changing the mode field of the optical signal in a lateral and transverse direction to the propagation direction of the waveguide to reduce a polarization dependent loss.

In another aspect of the invention, the VOA further includes at least one air gap in the polymeric waveguide disposed between and/or substantially near at least one of the at least two temperature varying means for increasing the substantially localized temperature gradient. A dimension of the at least one air gap is chosen such as to avoid substantial diffraction losses of the optical signal.

In another embodiment of the invention, the polymeric waveguide of the VOA is interspersed with at least one section of a silica waveguide between and/or substantially near at least one of the two refractive index varying means for increasing the substantially localized refractive index gradient.

In accordance with a further aspect of the invention, the polymeric waveguide has an input end and an output end, said input and output ends being optically coupled to an optical fiber, wherein one of said at least two refractive index varying means is disposed substantially at the input end and the other one of said at least two refractive index varying means is disposed substantially at the output end for inducing the substantially localized refractive index gradient at the input and output ends for attenuating an optical signal passing through said section.

In accordance with a further embodiment, a portion of the polymeric waveguide in which at least one of the substantially localized varying refractive index regions is induced, comprises a tapered waveguide for expanding the mode field to increase the transition loss of the optical signal.

In accordance with yet another embodiment of the invention, the VOA further includes a secondary waveguide for reducing a refractive index difference between the core and the cladding to facilitate the shift of the mode field, said secondary waveguide being disposed adjacent to the core of the polymeric waveguide between the core and the substrate. The refractive index of the secondary waveguide is smaller than a refractive index of the core of the polymeric waveguide. A width and a height of the secondary waveguide are preselected for yielding a predetermined polarization dependent loss. In accordance with another embodiment of the invention, the secondary waveguide is a polymeric waveguide or a silica waveguide. If the secondary waveguide is a silica waveguide a hybrid waveguide is produced affording a power efficient VOA.

In another embodiment of the invention, the temperature varying means and the waveguide define an angle therebetween for reducing back reflection.

In accordance with yet another embodiment of the present invention, the VOA includes more than two refractive index varying means, wherein a number of refractive index varying means is predetermined in dependence upon a predetermined degree of attenuation of the optical signal generated by each one of the number of refractive index varying means.

In accordance with another aspect of the invention, the polymeric waveguide is an array of polymeric waveguides affording a VOA array.

In accordance with the invention, there is further provided a variable optical attenuator comprising a substrate of a heat absorbing material, a polymeric waveguide having a polymeric core disposed within a polymeric cladding upon the substrate, and at least two temperature varying means spaced apart along the polymeric waveguide for one of increasing and decreasing the temperature of said waveguide for generating a substantially localized refractive index gradient in the waveguide near the temperature varying means to shift a mode field of an optical signal propagating through said polymeric waveguide to cause a transition loss of the optical signal for attenuating the optical signal, said refractive index gradient being substantially localized in a propagation direction of the optical signal.

Advantageously, polymeric VOAs and arrays can be realized without requirements on the refractive index of the substrate. VOAs and arrays in accordance with the present invention provide several advantages with respect to reduced insertion losses, power dissipation, enhanced temperature stability, size and speed.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENTS

Figure 1:
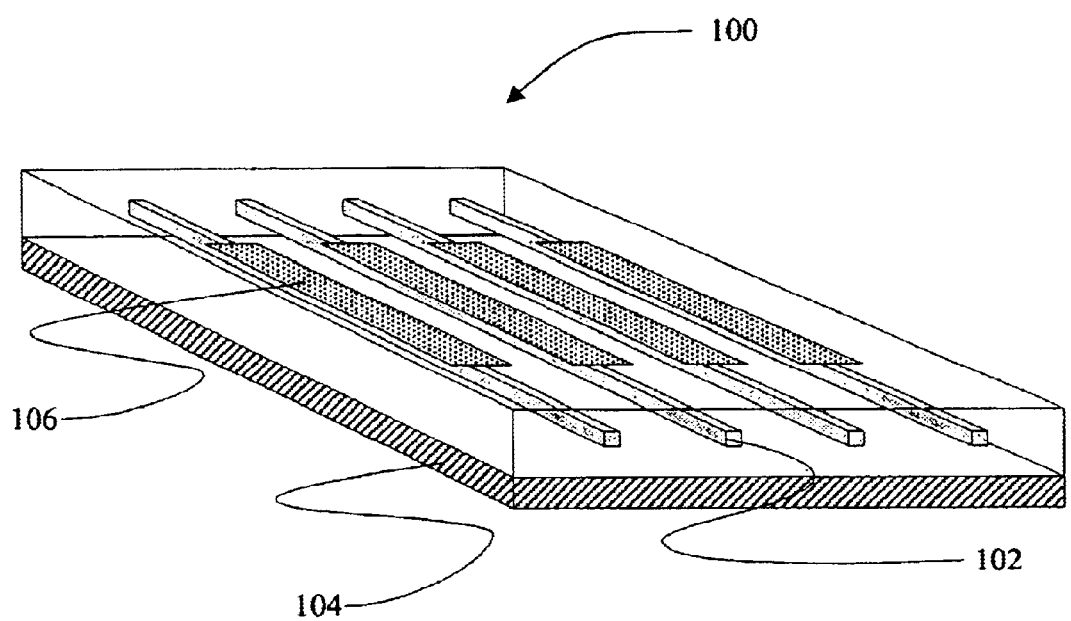
FIG. 1 shows a schematic presentation of a prior art thermo-optic polymeric waveguide VOA array.
Figures 2A, 2B:
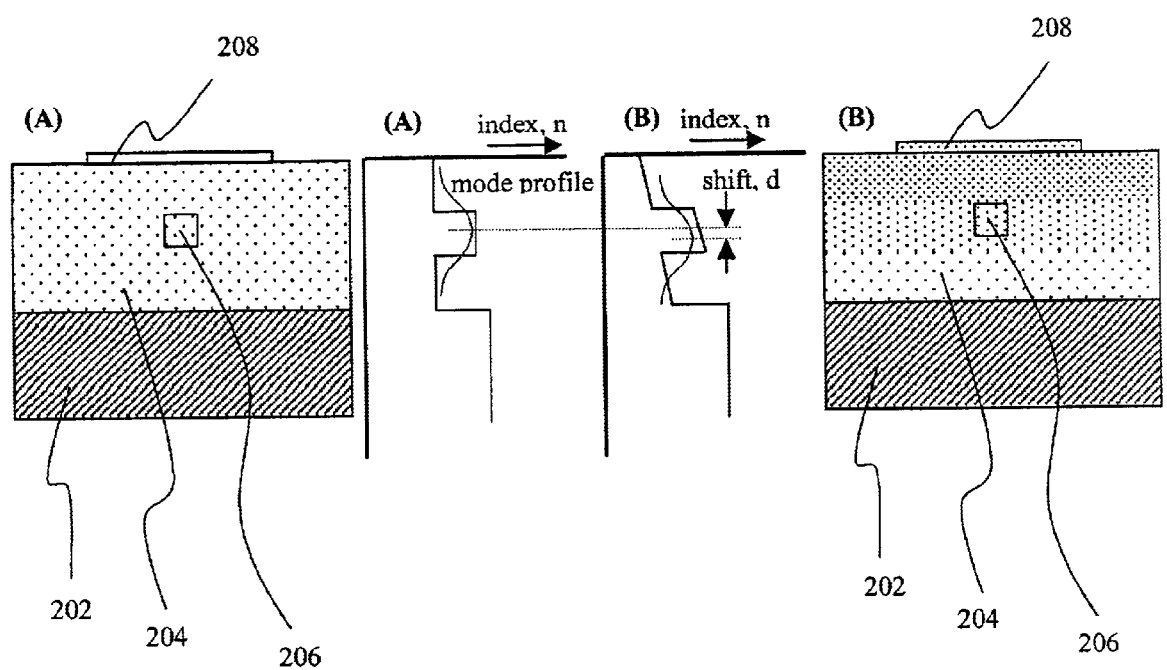
FIGS. 2(A) and 2(B) show cross-sectional views of a polymeric waveguide VOA to demonstrate a shift of a mode profile upon applying heat to a polymer waveguide.

Turning now to FIG. 1 a schematic presentation of a prior art thermo-optic polymeric waveguide VOA array 100 is shown, similar to the one disclosed in a paper presented by T. C. Kowalczyk et al. of Gemfire Corporation entitled "Variable Optical Attenuator With Large Dynamic Range and Low Drive Power", published in Optical Fiber Communication Conference and Exhibit, 2001; OFC 2001, Volume: 3, 2001 Page(s): WR5-1-4, which is incorporated herein by reference for all purposes. Attenuator array 100 consists of straight embedded polymer channel waveguides 102 on a glass substrate 104. A resistive metal stripe heater 106 fabricated on the top cladding of the waveguide creates a strong thermal gradient in the polymer layerstack. This is shown in more detail in conjunction with FIGS. 2(A) and (B). FIG. 2(A) illustrates the placement of a resistive heater 208 on top of a waveguide consisting of a polymer stack 204 having a layer stack thickness t in which is embedded a polymer core 206. The waveguide is supported on a substrate 202. When the heater 208 is in an off-mode, the mode profile of a beam of light passing through the waveguide is centered in the core 206. FIG. 2(B) illustrates the heater 208 in an on-mode, heating the waveguide and creating a thermal gradient, as indicated by a gradient in the dot density of the polymer layer stack 204 and the polymer core 206 in FIG. 2(B). Associated with the thermal gradient, there is a strong refractive index gradient with the lowest refractive index under the heater 208. The refractive index gradient causes a shift d of the optical mode in the channel towards the substrate 202. An attenuation can be induced by two different mechanisms, (a) a leakage into a higher refractive index substrate, or (b) a transition loss between heated and unheated segments in the waveguide. Kowalczyk et al. disclose a VOA operation based on the leakage to the glass substrate. The leakage mechanism requires a specific value of the substrate refractive index, which is related to the polymer waveguide indices, in addition to that of the refractive index and the thickness of the bottom bufferlayer. The use of a glass substrate and a sensitivity to ambient temperature indicates that the VOA disclosed by Kowalzcyk et al. is designed for substrate leakage operation. However, if the operating principle is based on the transition loss mechanism, the VOA would be insensitive to ambient temperature. Unlike interferometric components, the wavelength sensitivity is also small. Kowalzcyk et al. state that: "light propagating in the waveguide is deflected (reflected and refracted) out while propagating through the refractive index modified segment during attenuator operation." A single, relatively long resistive heater segment 106 (FIG. 1) of 300–900 $\mu$m is used, indicative that this VOA design is based on substrate leakage.

However, in accordance with the present invention, the transition loss mechanism only requires an abrupt (non-adiabatic) refractive index gradient transition between heated and unheated regions. There is no requirement on the length of the heated region. Thus, cascading a number of these transitions can enhance the sensitivity of the VOA.

It is advantageous to use highly UV-cross-linked polymer rubbers as waveguide materials, because they have a relatively high thermo-optic coefficient (<−4.0×10$^{-4}$/deg. C.) without volume relaxation (refractive index hysteresis) effects. If desired, the waveguide birefringence is chosen to be small (<0.0002) to ensure low PDL in the off-state. A waveguide patterning was carried out by a photo-resist type of patterning process. These materials exhibit a good environmental stability.

In the following, an analysis of the transition loss mechanism is presented to demonstrate that it can be exclusively used for the operation of a VOA. Furthermore, the analysis presented provides further means and methods to improve the design of a VOA based on the transition loss mechanism.

A simple analytical expression of the induced attenuation (Att) due to a transition loss, is presented in the article by D. Marcuse in The Bell System Tech. Journal Vol. 56, No. 5, pp 703–718, (1977). It is based on a Gaussian approximation of the mode field in a single mode fiber or fiber compatible channel waveguides:

$$Att = 10 \log \{\exp(-d^2/\omega^2)\} = 4.343 d^2/\omega^2 \text{ (Att in dB's)} \quad (1)$$

wherein d is the offset or mode shift and $\omega$ is the spot size radius.

Figure 3:
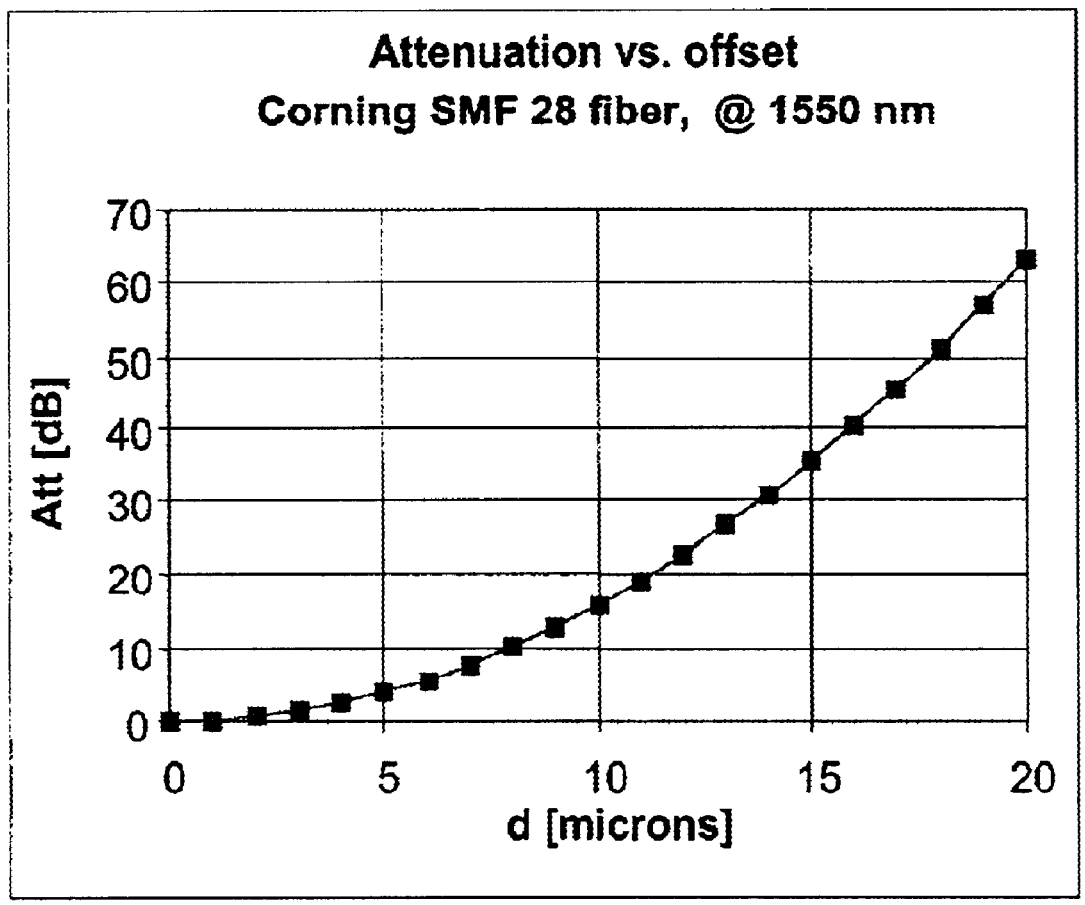
FIG. 3 shows a graph of attenuation as a function of an offset for a standard single mode fiber.

FIG. 3 shows a graph of attenuation as a function of an offset for a standard single mode fiber (Corning SMF 28) with a spot size radius of 5.25 $\mu$m at 1550 nm. This graph shows that an offset of about 10 $\mu$m is required between fiber-compatible waveguides to induce an attenuation >15 dB.

The mode shift can be analyzed by superimposing a linear tilt to the waveguide refractive index profile (see FIG. 1). The linearity of the tilt profile is exact for heaters that are much wider than the waveguide core. Such tilted waveguide profiles have been analyzed in the framework of bent waveguides. The concept of an "equivalent straight waveguide" to approximate a curved waveguide, yields a tilted refractive index profile (see: D. Marcuse, JOSA-66 pp. 311–320, 1978). The mode shift, d, in such a profile with respect to the unpertubated profile can be found in several textbooks on waveguide theory, such as in C. Vassalo, "Optical Waveguide Concepts", Elsevier, 1991 p. 231):

$$d = k^2 n^2 \omega^4 / 4R \quad (2)$$

wherein n is the effective refractive index, R is the bend radius, and $k=2\pi/\lambda$ and $\lambda$ is the wavelength.

The relation between the bent radius and the tilt angle $\alpha$ is as follows:

$$R = n/\tan(\alpha) \quad (3)$$

The tilt angle can be expressed in the thermo-optic coefficient dn/dT and the temperature gradient dT/dt across the layerstack of thickness t:

$$\tan(\alpha) = (dn/dT)(dT/dt) = (dn/dT)(T/t) \quad (4)$$

Combining equations (3) and (4) with equation (2) yields:

$$d = (\pi/\lambda)^2 n\omega^4 (dn/dT)(T/t) \quad (5)$$

For t=30 $\mu$m, $\omega$=5.25 $\mu$m, n=1.33, dn/dT=0.0004 the shift is: d=0.07 $\mu$m/deg.

A relation between the temperature rise T of a heater stripe on a heat sinked layer and power dissipation per unit length, P/l can be found in "Integrated Optical Circuits and Components" ed. E. Murphy, Marcel Dekker, p. 265:

$$T = P/\{(l\phi)(0.88 + w/t)\} \tag{6}$$

wherein φ is the thermal conductivity of the layer and w is the width of the heater.

For t=30 μm, w=6 μm and φ=0.2 W/(mK) for polymers, equation 6 yields T=5 degrees per mW/mm power dissipation. In combination with the previous result, this yields a shift of d=0.35 μm per mW/mm dissipation. A 100 μm long heater section would require 3 mW for a shift of 10 μm. This induces a loss of 2×15=30 dB for a fiber compatible waveguide section (FIG. 3). The prior art VOA disclosed by Gemfire Corp. requires 10 mW for 30 dB using a 300–900 μm long heater. This is consistent with the analysis of the transition loss mechanism as presented heretofore.

From equations (1), (5) and (6) it can be seen that the dependence of attenuation on power dissipation is quadratic. Kowalczyk et al. only show a quadratic dependence of attenuation at low power dissipation, indicating inherent temporary transition losses as initial losses when employing the leakage-to-the-substrate mechanism. After the initial stage, the curve deviates from quadratic behaviour and apparently leakage to the substrate starts to occur.

The analysis presented heretofore is based on a shift of Gaussian mode profiles with unchanging shape. In the waveguide cross-section of the prior art VOA disclosed by Kowalczyk et al., the mode in the waveguide core is coupled via the bottom cladding to the glass substrate. This will cause a strong lateral expansion of the mode profiles at large shifts resulting in high polarization dependent losses (PDL) at high attenuations. In accordance with the present invention, a polymer waveplate between two identical waveguide sections is used to remove high PDL.

In accordance with another embodiment of the present invention, an acceptable PDL at high attenuation is obtained by using small mode shifts in combination with a larger number of localized varying temperature regions by providing a plurality of smaller heater elements (e.g. 20–100 μm) to create a plurality of temperature gradients over a small length in the propagation direction. An alternative approach is the use of laterally displaced heaters such that the mode is shifted both downwards and sidewards thereby creating a more symmetric situation for both polarizations.

In accordance with yet another embodiment of the present invention, lateral boundaries are employed in the bottom cladding to prevent excessive lateral mode expansion. This is shown in more detail in conjunction with FIG. 4 presenting such a waveguide cross-section.

Figure 4:
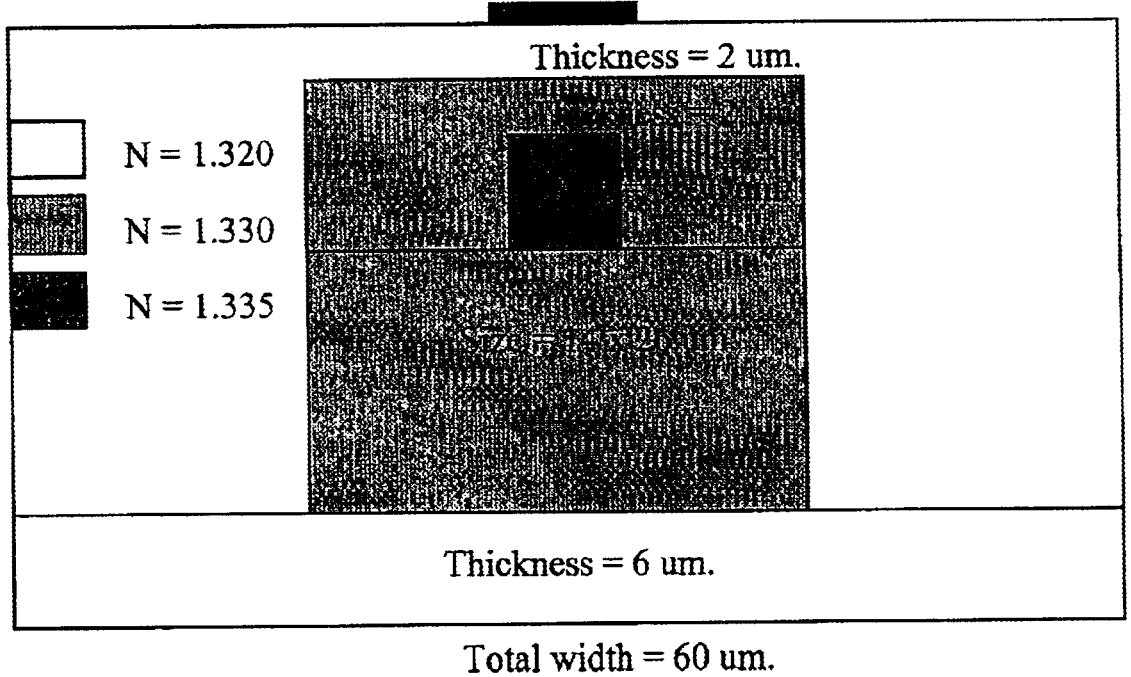
FIG. 4 shows a cross-sectional view of a waveguide employing lateral boundaries in the bottom cladding to prevent excessive lateral mode expansion.
Figure 5:
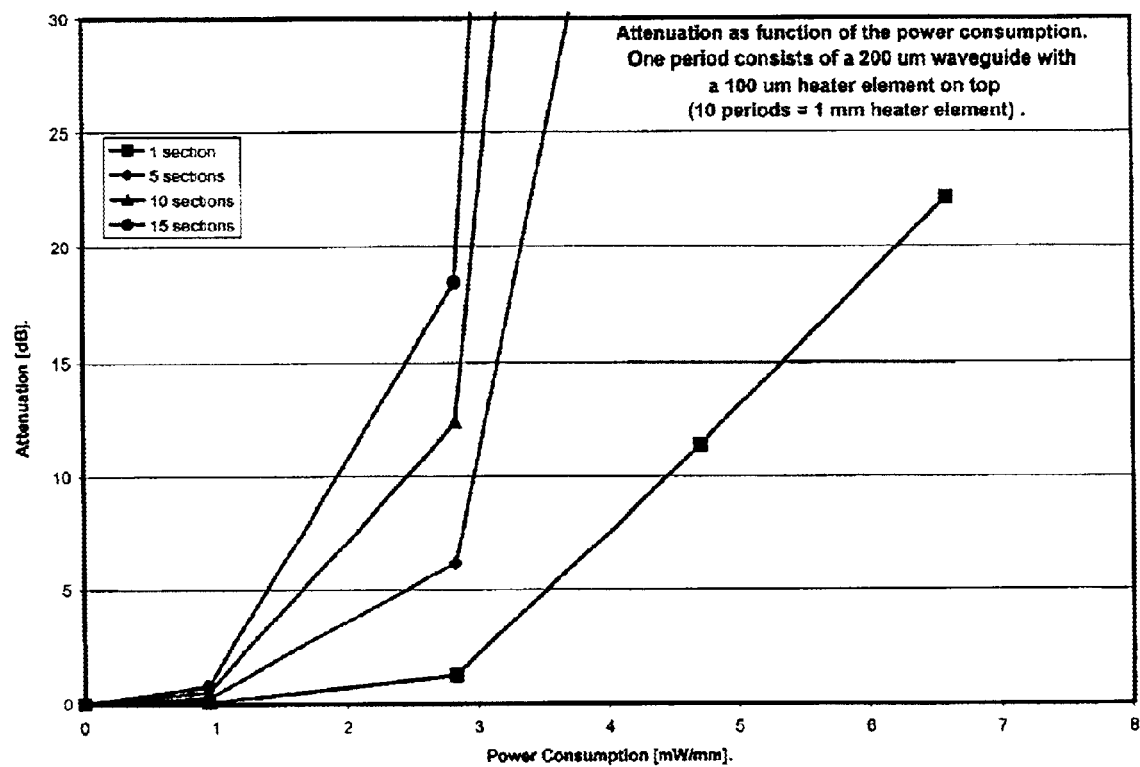
FIG. 5 presents a graph of attenuation as a function of power consumption for the waveguide presented in FIG. 4.
Figure 6:
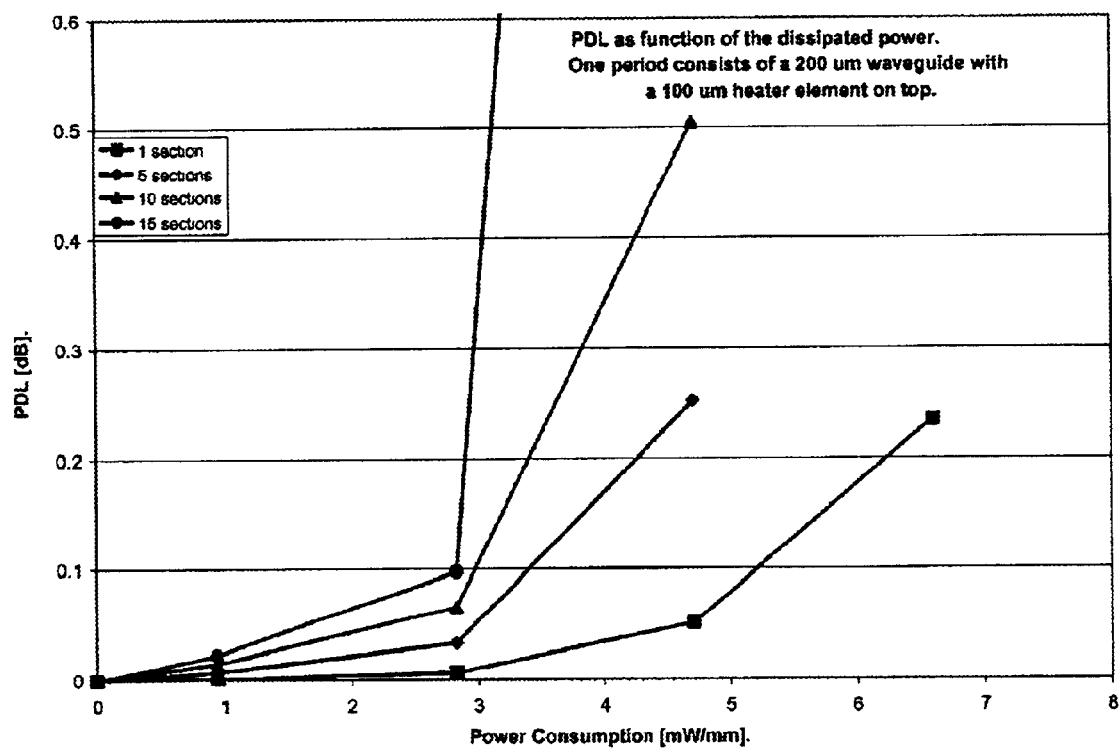
FIG. 6 presents a graph of PDL as a function of dissipated power for the waveguide presented in FIG. 4.

FIGS. 5 and 6 present two simulated graphs of attenuation as a function of power consumption and PDL as a function of dissipated power, respectively, for the exemplary waveguide cross-section presented in FIG. 4. These figures show that very low power dissipation and low PDL are obtained for cascaded regions of varying temperature.

Figure 7:
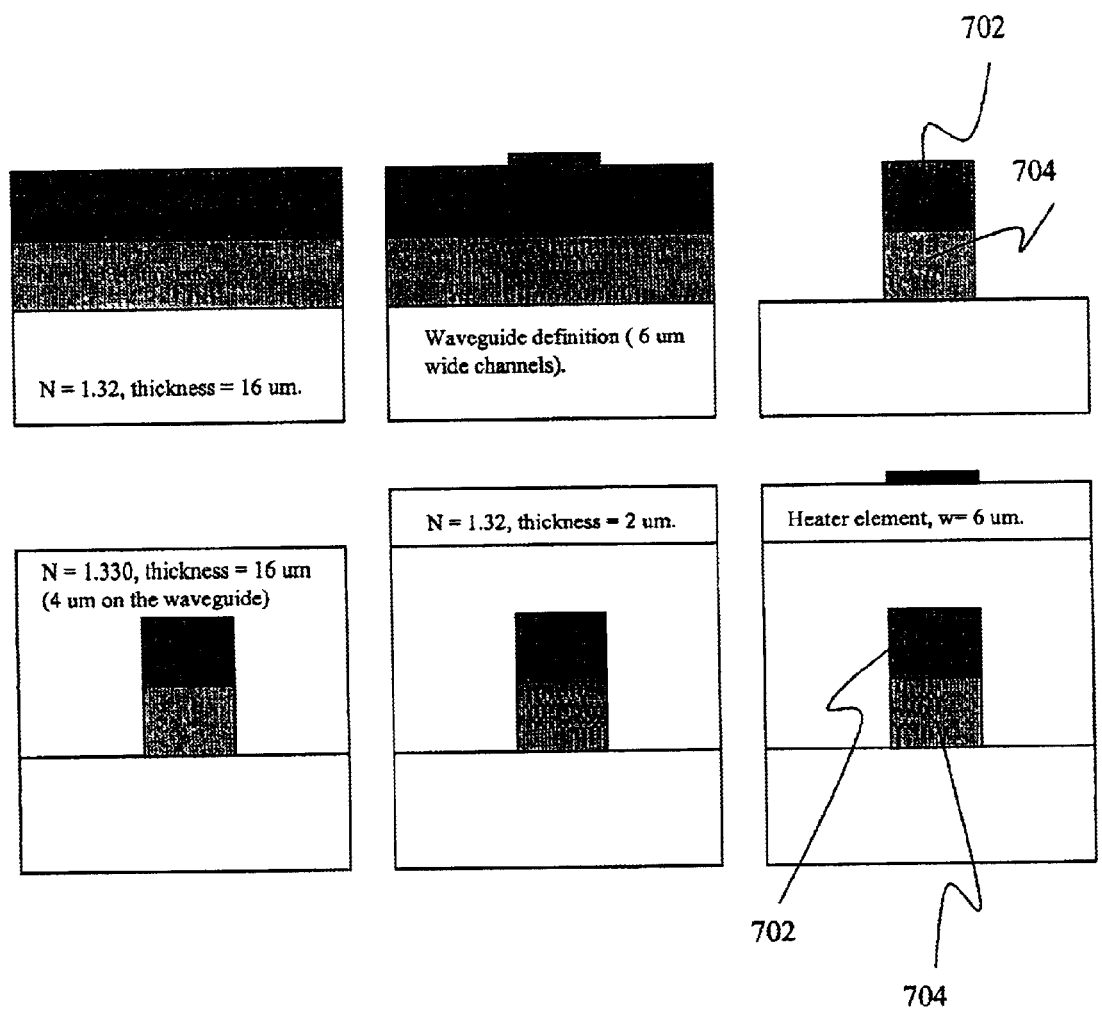
FIG. 7 shows a plurality of cross-sectional views of a process for making a waveguide cross-section with lateral boundaries in the bottom cladding of the same width as the core.

FIG. 7 shows a plurality of cross-sectional views of a process for making a waveguide cross-section with lateral boundaries in the bottom cladding of the same width as the core. Such a structure is easily realized with reactive ion etching using an (auto-aligned) mask for both the core 702 and the bottom cladding 704, i.e. the "shadow" core or secondary waveguide.

Figure 8:
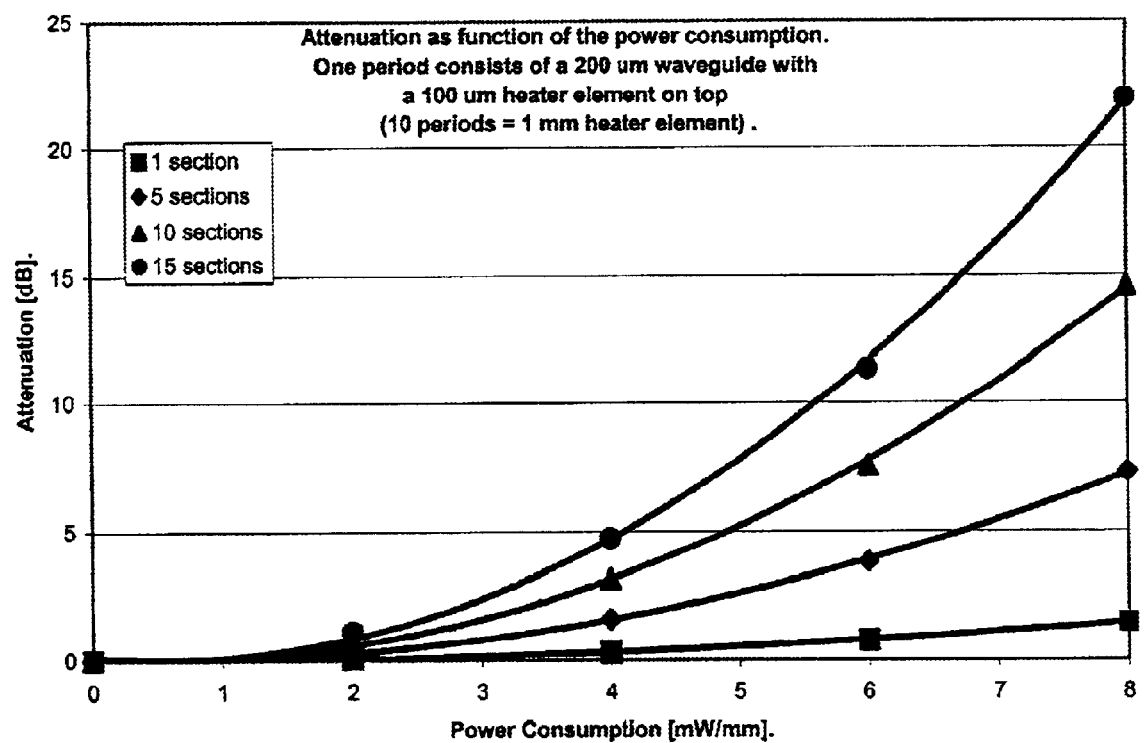
FIG. 8 presents a graph of attenuation as a function of power consumption for the exemplary waveguide cross-section presented in FIG. 7.
Figure 9:
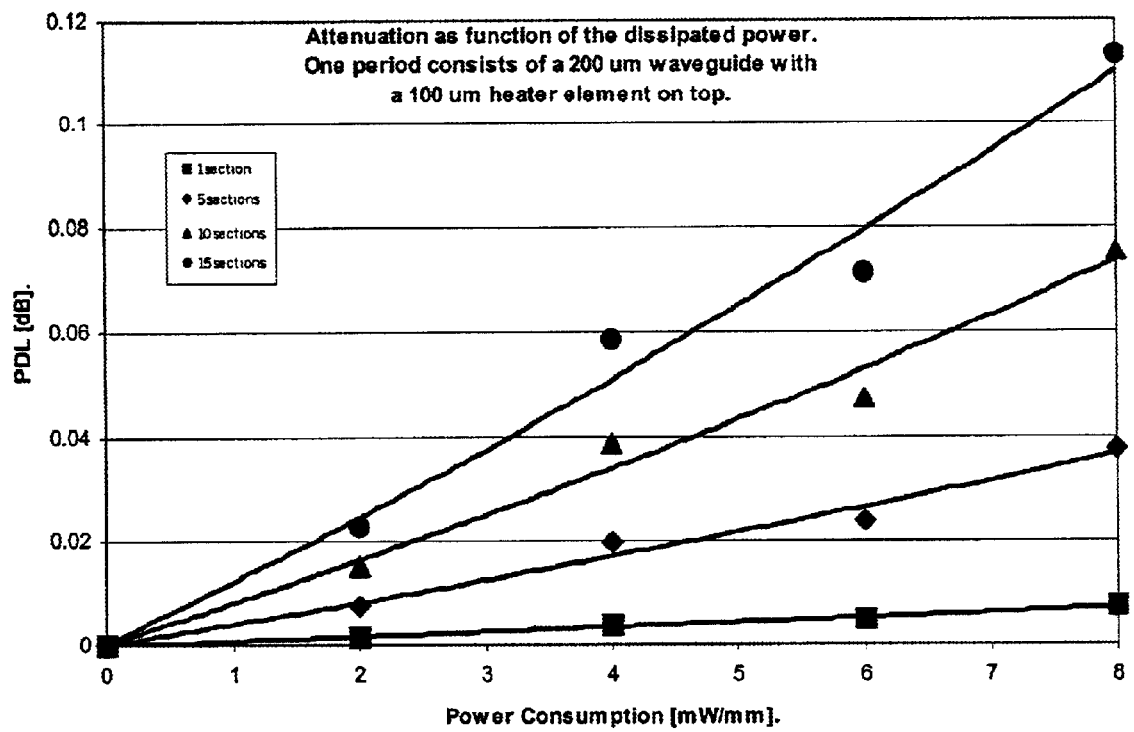
FIG. 9 presents a graph of PDL as a function of dissipated power for the exemplary waveguide cross-section presented in FIG. 7.

FIGS. 8 and 9 show two simulated graphs of attenuation as a function of power consumption and of PDL as a function of dissipated power, respectively, for the exemplary waveguide cross-section presented in FIG. 7. It is apparent from these figures that the attenuation sensitivity is reduced while the PDL value is improved.

Figure 10:
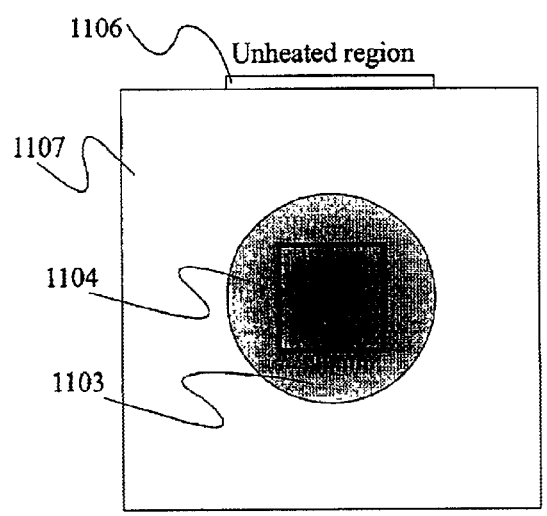
FIGS. 10 and 11 present cross-sectional views of a waveguide VOA in accordance with the present invention illustrating the mode shift between an unheated region and a heated region.
Figure 11:
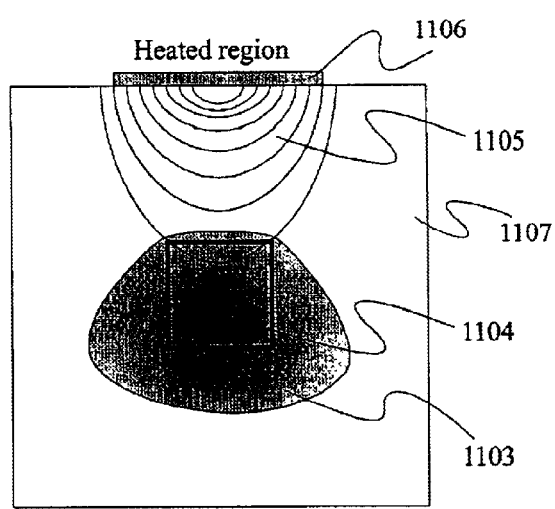

FIGS. 10 and 11 present cross-sectional views of a waveguide VOA in accordance with the present invention illustrating the mode shift between an unheated region and a heated region, respectively. As discussed heretofore, the VOA of the present invention is based on transition losses, e.g. attenuation, PDL, between unheated and heated regions. FIG. 10 shows the mode field 1103 of a light beam propagating through a core 1104. A resistive heater 1106 is placed on top of the waveguide 1107. FIG. 11 illustrates the shift of the mode profile for a heated region. The resistive heater 1106 is giving off heat and a temperature gradient is created as indicated by the temperature lines 1105 below the heater 1106. The mode-profile 1103 is altered and shifted downwards in waveguide 1107.

As can be seen from FIG. 11, a large shift of the mode profile towards the buffer layer causes strong lateral expansion of the mode profile resulting in high PDL. Further studies showed that coupling to a higher refractive index substrate also causes high PDL.

In accordance with another embodiment of the invention, refractive index boundaries in the bottom cladding are used to prevent the mode from expanding to excessively in the lateral direction and to couple to a higher index substrate.

Figure 12:
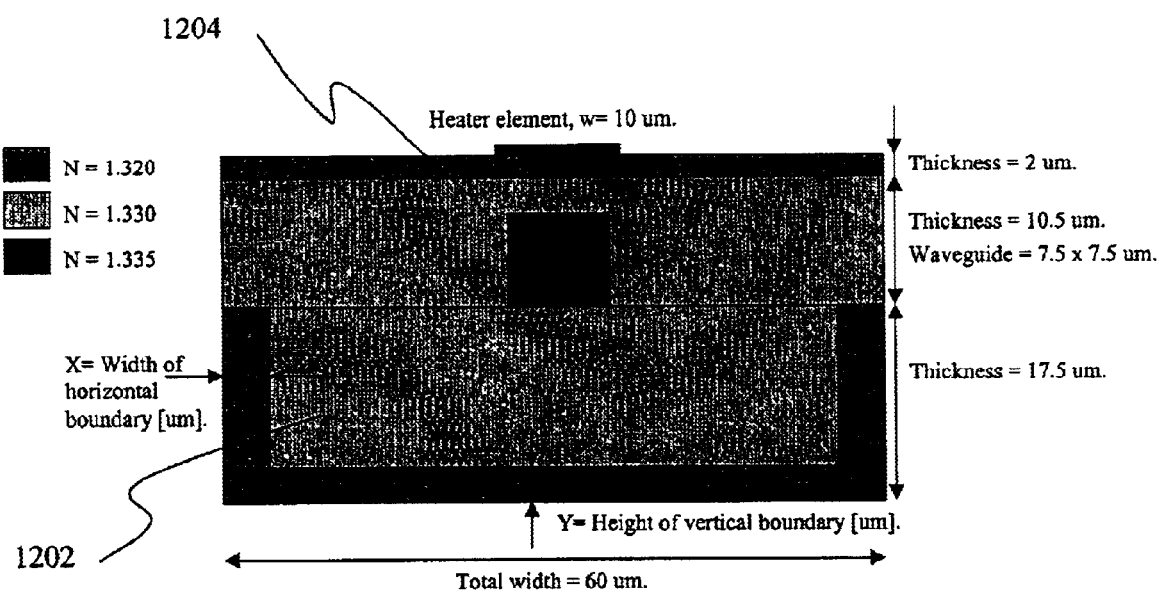
FIG. 12 shows a waveguide cross-section of another embodiment of a waveguide VOA in accordance with the invention wherein refractive index boundaries in the buffer layer create a secondary waveguide to effect PDL.

FIG. 12 shows a waveguide cross-section of another embodiment of a waveguide VOA in accordance with the invention wherein refractive index boundaries in the buffer layer are used to effect/reduce the PDL. These refractive index boundaries create a secondary waveguide 1202 with a lower refractive index and this secondary waveguide is positioned below the original waveguide core 1204. The width (X) of the horizontal boundary and the height (Y) of the vertical boundary of this secondary waveguide are selected so as to yield a respective PDL. Due to the secondary waveguide, the refractive index barrier or difference towards the bottom cladding is lower causing an easier mode shift in the vertical direction.

Figure 13:
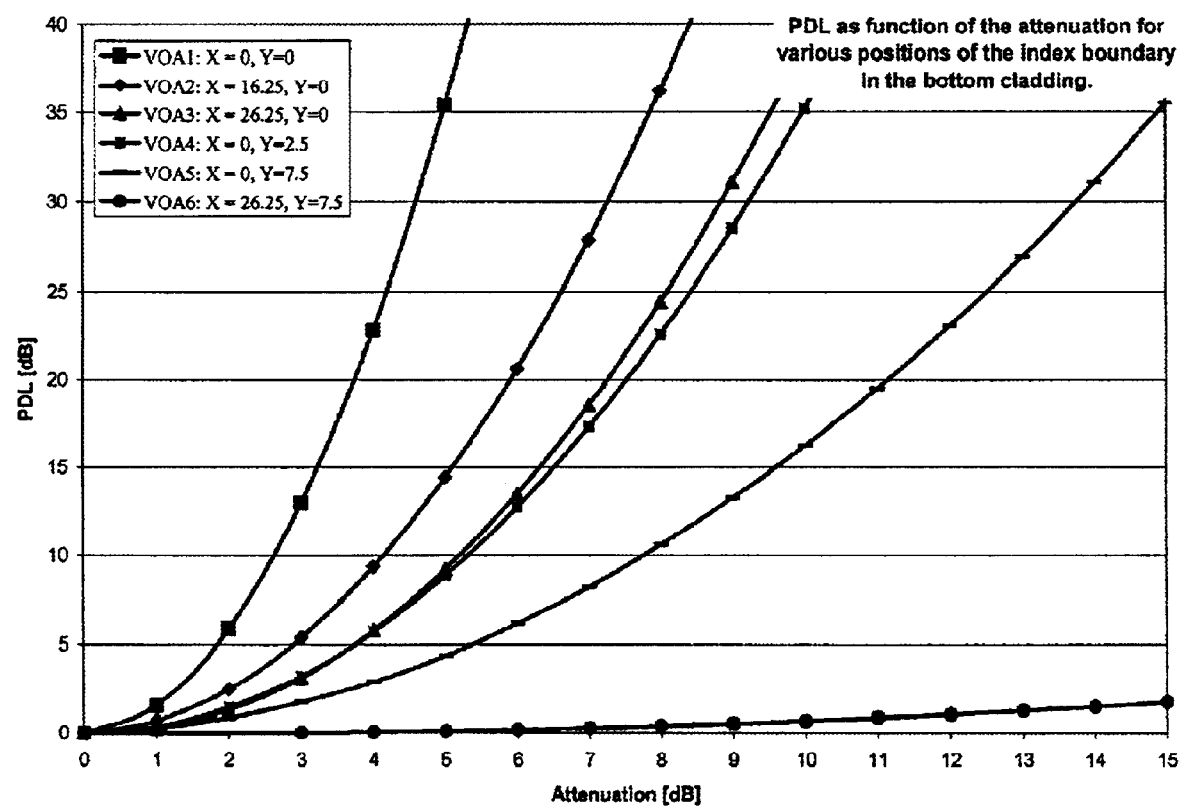
FIG. 13 shows various graphs of PDL as a function of attenuation for various positions of the refractive index boundary in the bottom cladding.

FIG. 13 shows various graphs of PDL as a function of attenuation for various waveguide cross-sections, i.e. for various positions of the refractive index boundary in the bottom cladding. PDL values have been calculated using a 2 mm straight waveguide with various positions of the index boundaries and one heated segment of 100 μm. The simulation results presented in FIG. 13 show that using index boundaries in the bottom cladding can decrease the PDL significantly. The best results are obtained when a secondary lower index waveguide (e.g shadow waveguide) is created below the high index waveguide. This allows to control the shift of the mode profile in such a way that coupling to a higher index substrate and excessive expansion in the lateral direction is prevented. It is noted, that this concept is based on pushing the mode profile into the secondary waveguide and that it is not based on coupling between the waveguides.

Figure 14:
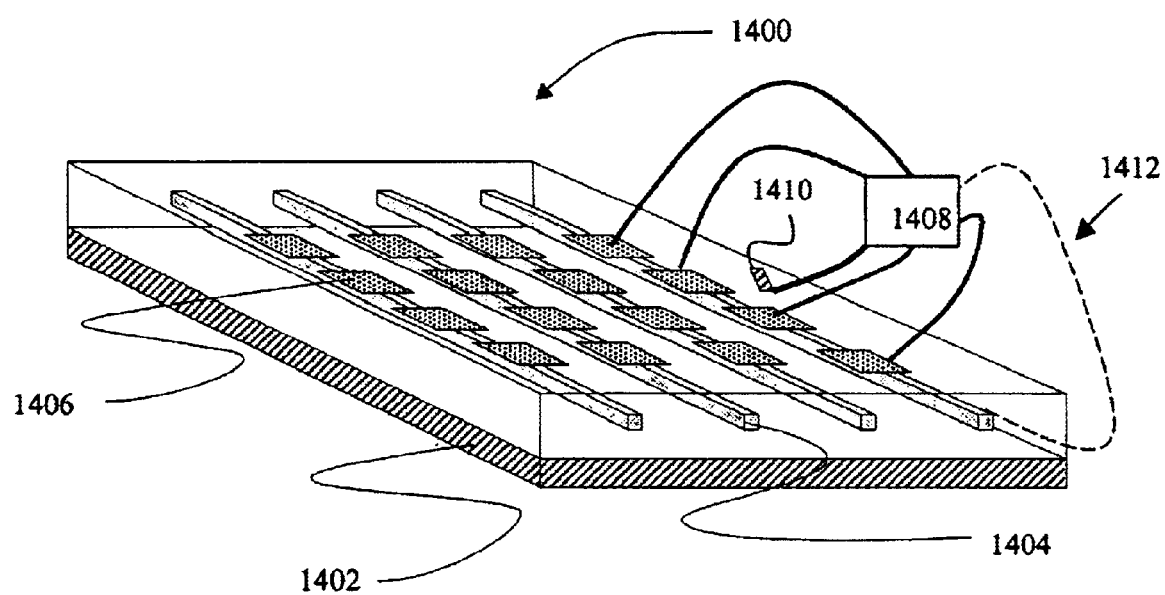
FIG. 14 shows a schematic view of a VOA array in accordance with the present invention.

However, if the PDL is still not sufficient to use the present invention for variable optical attenuators, the optical performance of the VOA of the present invention is improved by increasing the number of heated segments in a single waveguide. This is shown in more detail in FIG. 14 illustrating a schematic view of a VOA array 1400 of polymer waveguides 1404 supported on a silicon substrate 1402. A plurality of heaters 1406, controlled by a controller 1408, are arranged in-line and spaced apart on an external surface of a waveguide 1404 along a propagation direction of an optical signal passing through the waveguide for generating a localized temperature gradient (and hence refractive index gradient) in the waveguide such that the optical signal propagating through the waveguide passes through a plurality of localized varying temperature regions for generating transition losses of the optical signal by causing a shift of a mode field of the optical signal. A sensor 1410 is mounted on the VOA array 1400 for sensing the temperature of the waveguide, and for providing the sensed temperature to the controller 1408, which controls the heaters 1406 in dependance thereon. Alternatively, a tap 1412 is used to monitor the attenuation of the light, and feedback this information to the controller for controlling the attenuation accordingly. The silicon substrate 1402 serves as a heat absorbing material to create an abrupt temperature change at an opposite side of the heater 1406 in order to create a large temperature gradient over a small length in the propagation direction of the optical signal. The silicon substrate has a high thermal conductivity compared to the polymer waveguide (approximately 1000 times larger) which enables the silicon substrate to serve as a heat sink. The invention is not intended to be limited to the use of silicon as a substrate material, and any material having similar heat absorbing properties may be used. Since the substrate serves as a heat sink, a steep temperature gradient is generated between heated and unheated regions of the waveguide so that transition losses are generated when an optical signal passes through the plurality of localized varying temperature regions of the waveguide.

Advantageously, the VOA in accordance with the present invention has low PDL characteristics by employing a plurality of small heater segments and hence creating a plurality of small shifts. Hence, a maximum attenuation of the VOA of the present invention depends upon the number of heaters. This provides for the further advantage of a low power consumption because the heater elements are relatively small.

In accordance with a further embodiment of the invention, a predetermined attenuation is achieved by varying the number of cascaded temperature varying means accordingly. Each temperature varying means yields a certain shift of the mode field corresponding to a respective attenuation.

Heretofore, the described refractive index varying means were temperature varying means, and in particular heating means, such as resistive heaters. However, the invention is not intended to be limited to the use of heating means. Alternatively, other means are employed to generate a localized refractive index gradient in the polymeric waveguide, such as cooling means or means for varying electro-optic characteristics of the waveguide.

Furthermore, changing the amount of power/voltage supplied to the temperature varying means changes the temperature of the temperature varying means and hence the magnitude of the transition losses, and this in turn varies the attenuation.

However, if mode beating becomes a problem for embedded polymer channel waveguides as a result of an interference of higher order modes with fundamental modes resulting in uncontrolled attenuation values and PDL, a more stable waveguide configuration is employed. Mode beating is avoided by an appropriate selection of indices and position of the refractive index boundaries of the waveguide.

Figure 15:
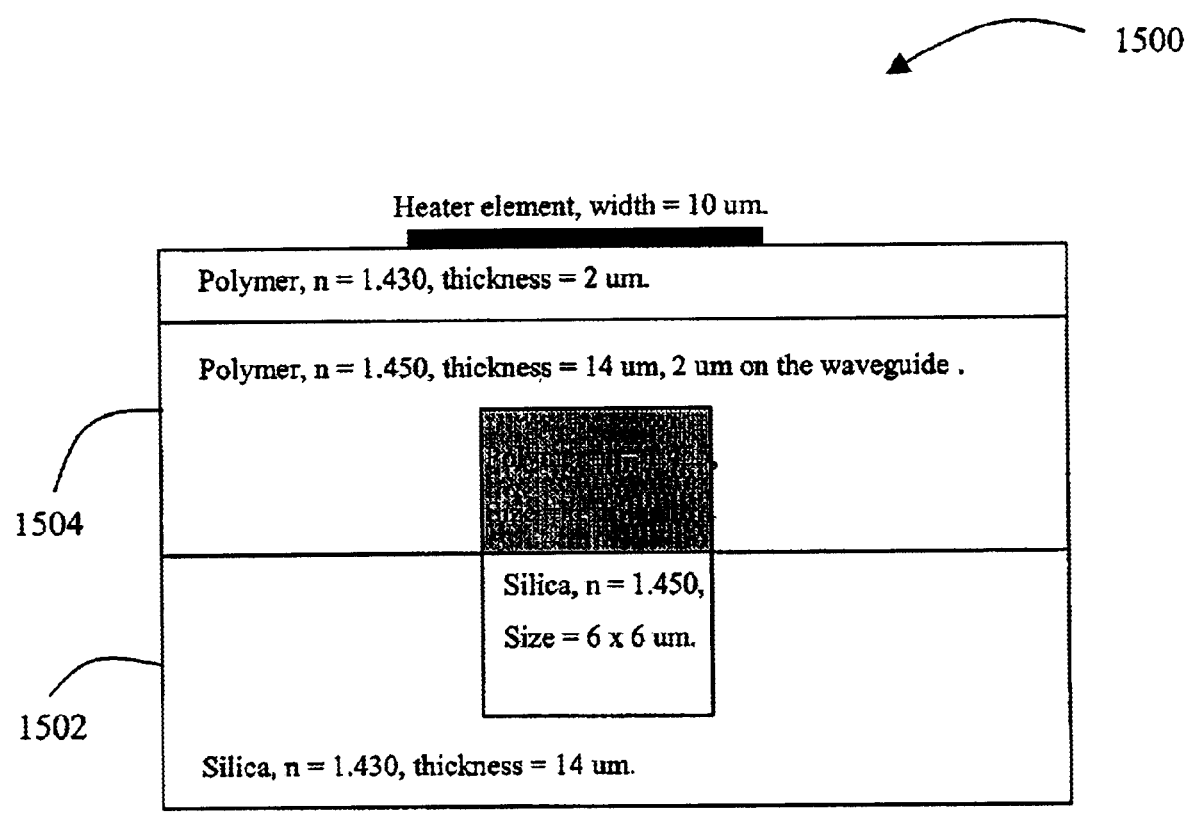
FIG. 15 shows a cross-sectional view of a hybrid waveguide combining a secondary silica waveguide with a polymer waveguide.

FIG. 15 shows a configuration of a hybrid waveguide cross-section 1500. The combination of a secondary silica waveguide 1502 with a polymer waveguide 1504 on top is an example of such a configuration.

Figure 16:
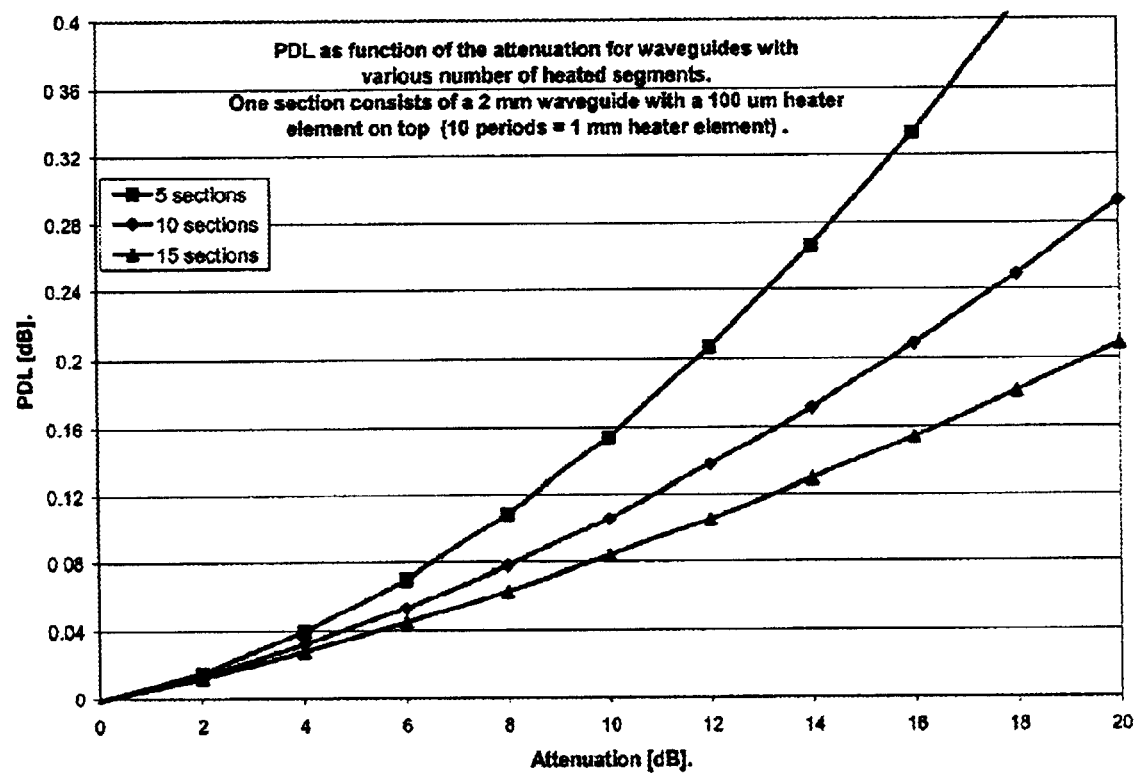
FIG. 16 presents a graph of PDL as a function of attenuation for the hybrid waveguide cross-section of FIG. 15.
Figure 17:
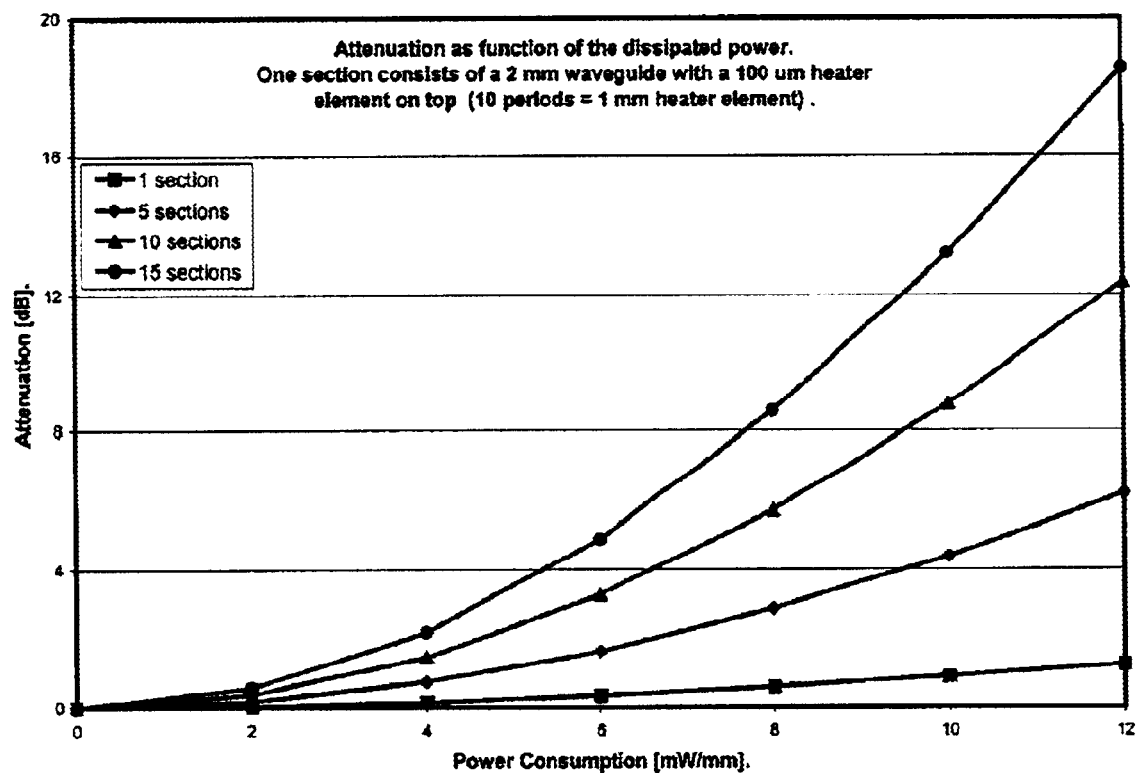
FIG. 17 presents a graph of attenuation as a function of dissipated power for the hybrid waveguide cross-section of FIG. 15.
Figure 18:
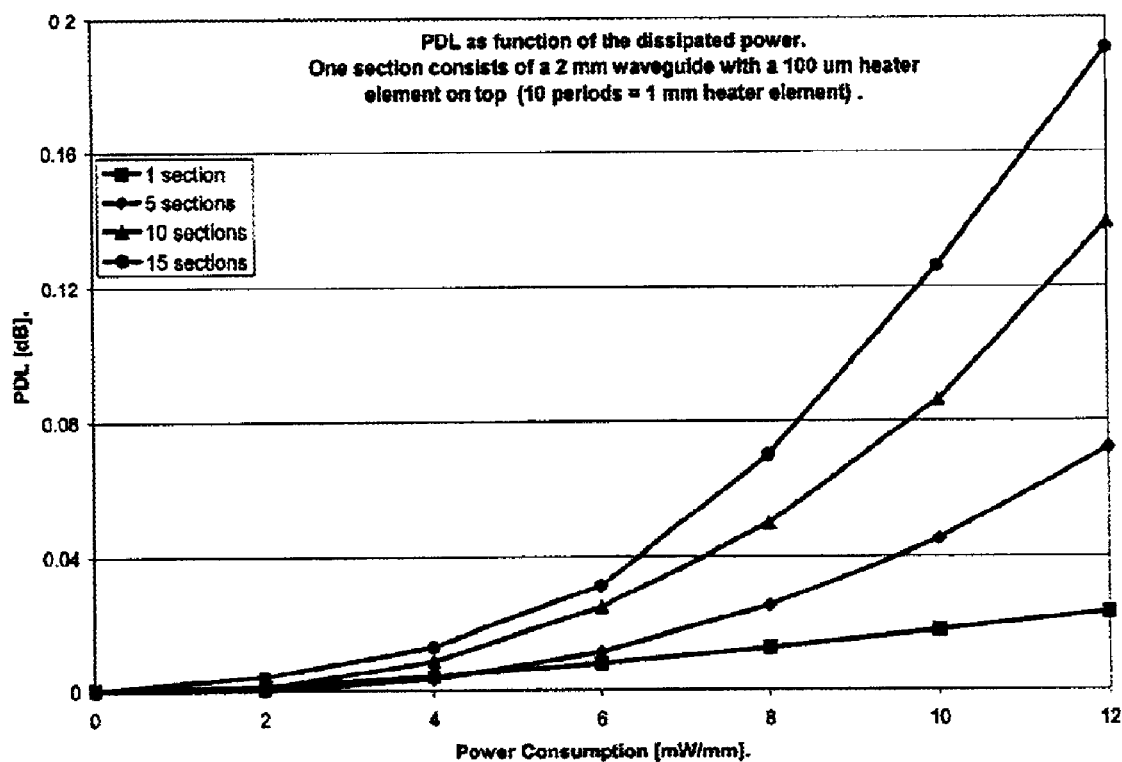
FIG. 18 presents a graph of PDL as a function of dissipated power for the hybrid waveguide cross-section of FIG. 15.

FIGS. 16, 17, and 18 show the results for a VOA having a hybrid polymer/silica waveguide cross-section, wherein FIG. 16 presents a graph of PDL as a function of attenuation for waveguides with a plurality of heated regions, FIG. 17 presents a graph of attenuation as a function of dissipated power, and FIG. 18 presents a graph of PDL as a function of dissipated power for the hybrid waveguide cross-section of FIG. 15. As can be seen, the use of a hybrid waveguide cross-section where the secondary waveguide consists of a material with a low dn/dT yields excellent attenuation values and low PDL.

Furthermore, a hybrid waveguide cross-section is advantageously used to further improve a power efficiency of the VOA of the present invention, because of the different thermo-optic coefficients dn/dT of silica (positive) and polymers (negative).

In accordance with another embodiment of the present invention, the waveguide channels are defined in the polymer matrix by a photoresist-type patterning process. Alternatively, a reactive ion etching process is employed in defining the channels.

In the embodiments described above, it was assumed that the transitions are step-like. In polymers the conditions for that are favorable because thermal gradients are steep due to a poor thermal conductivity of polymers. Furthermore, due to the extreme sensitivity of the VOA concept deviations from step-like transitions, resulting in reduced attenuation efficiency, can be tolerated to a high degree.

At boundaries between polymer and glass, step-like transitions are created due to widely different thermo-optic coefficients. In practice, these are found at the end faces where a glass fiber in a fiber array unit and polymer waveguides are butt-coupled. In addition, polymer waveguide sections grafted in silica channels utilize the same principle. Another approach is the use of small air gaps between the sections in order to take advantage of the poor thermal conductivity of air.

In the following, these and other embodiments to improve an operation of a polymeric waveguide VOA are described in more detail. It is noted, that these embodiments are employed individually or in combination to improve the operation of the VOA of the present invention.

Figures 19A, 19B:
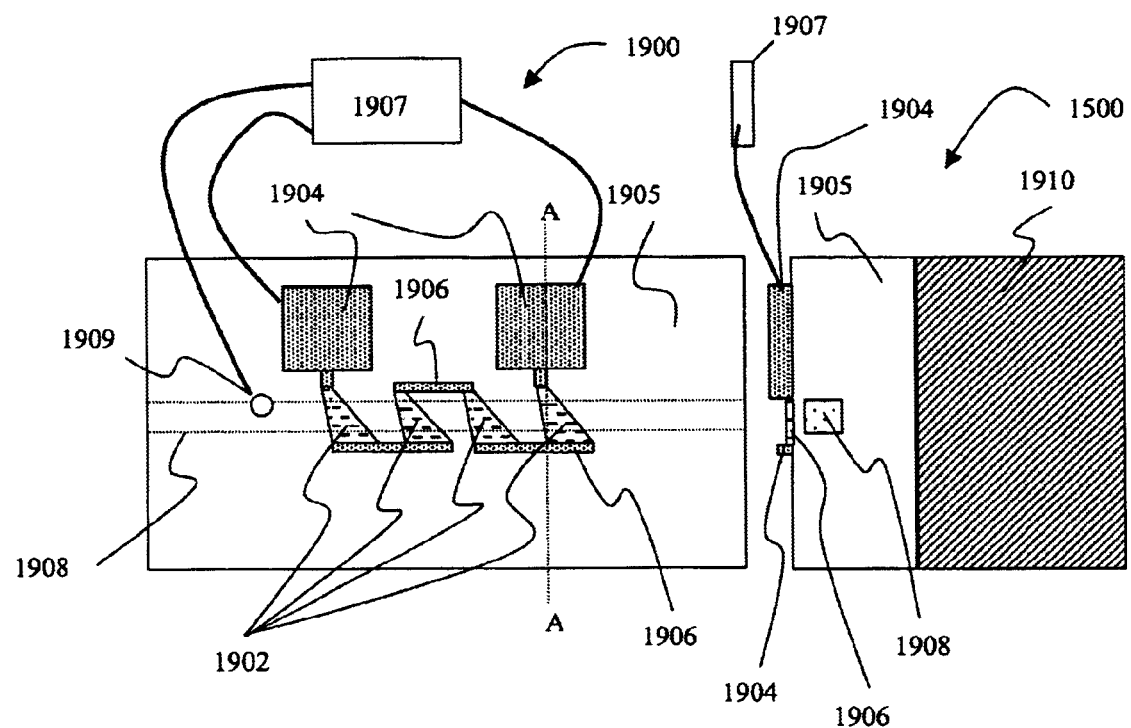
FIGS. 19a and 19b present a top plan view and a cross-sectional view, respectively, of a polymeric waveguide VOA employing cascaded laterally tapered heaters to reduce polarization dependent loss.

FIG. 19*a* shows a top plan view of a VOA 1900 having a plurality of cascaded temperature varying elements 1902, such as resistive heaters, that are connected via leads 1906 and bonded to the polymer cladding 1905 via bonding pads 1904. A temperature controller 1907 controls the resistive heaters in dependence upon the sensed temperature of the waveguide determined by a sensor 1909. The polymer core 1908 is denoted with dotted lines. FIG. 19*b* shows a cross-section along line A—A of FIG. 19*a* further showing polymer core 1908 and the substrate 1910. In accordance with this embodiment of the invention, the heaters 1902 are shown to be laterally tapered wherein the smaller width part of the heater is more resistive than the wider width part of the heater. These asymmetric heaters induce a thermal gradient in a lateral direction. Upon heater activation, the optical mode will shift in both directions, transversally and laterally thereby reducing the PDL.

Figure 20A:
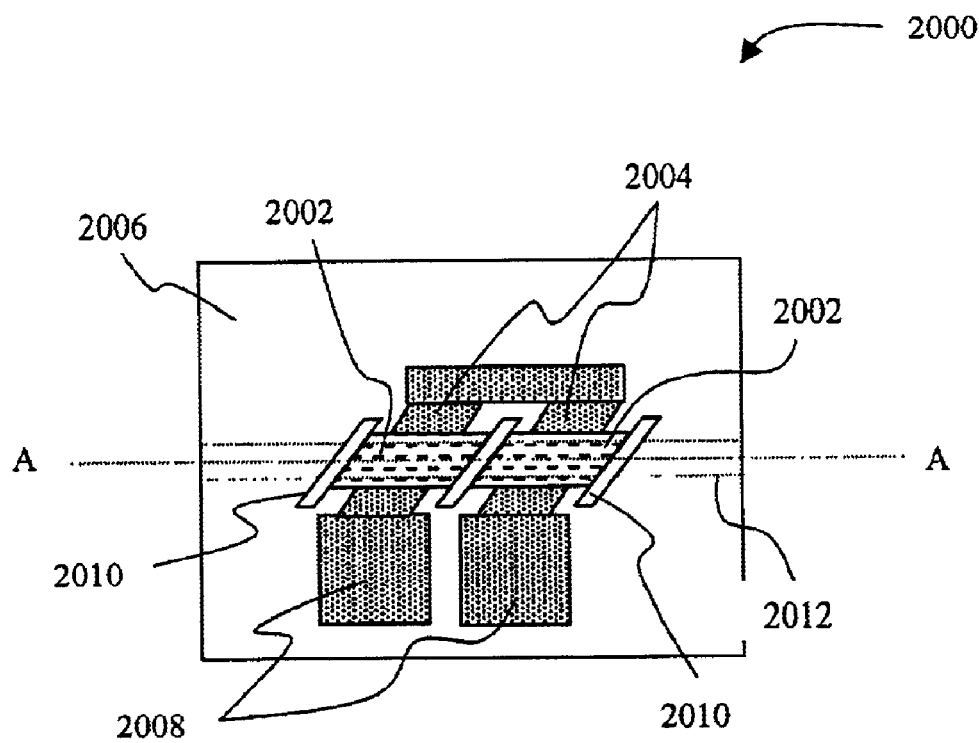
FIGS. 20a and 20b present a top plan view and a cross-sectional view, respectively, of a polymeric waveguide VOA employing air gaps and cascading to improve transition losses.
Figure 20B:
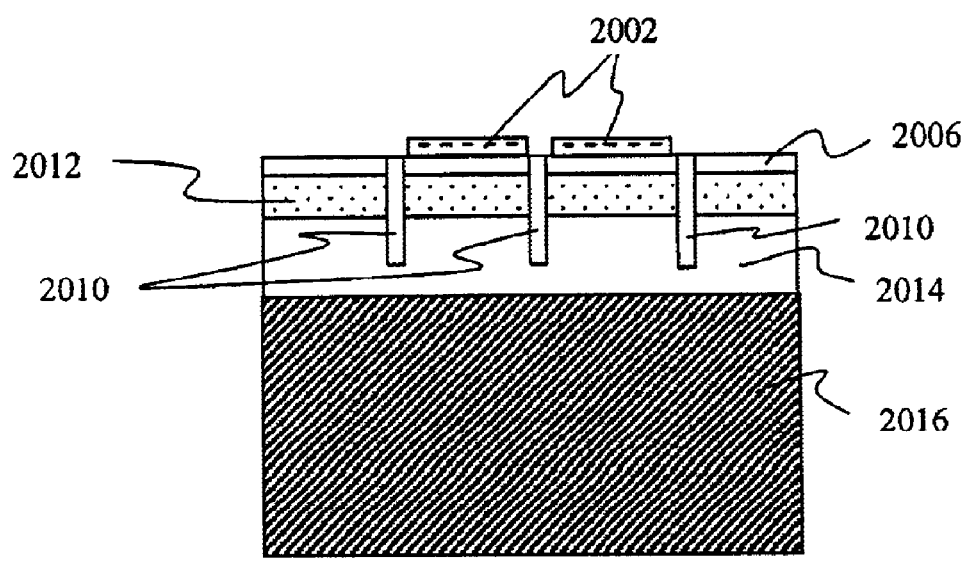

FIG. 20*a* shows a top plan view of a VOA 2000 in accordance with another embodiment of the present invention having a plurality of cascaded heaters 2002. The heaters 2002 are connected via leads 2004 and bonded to the top polymer cladding 2006 via bonding pads 2008. A plurality of small air gaps 2010 is provided between the heaters 2002 to enhance the abruptness (non-adiabaticity) of the coupling between the heated and unheated regions. This embodiment exploits the low thermal conductivity of air. Thus, the air gaps 2010 correspond to unheated regions to make the temperature gradient more steep or efficient between heated and unheated regions. A width of the air gaps 2010 is chosen such as to avoid large diffraction losses in the gaps, for example a width <20 microns. FIG. 20b shows a cross-sectional view along line A—A of FIG. 20a. As is seen from FIG. 20b, the depth of the air gaps extends from the top polymer cladding 2006 through the polymer core 2012 and into the bottom cladding 2014. The waveguide is supported on a substrate 2016.

Figures 21A, 21B:
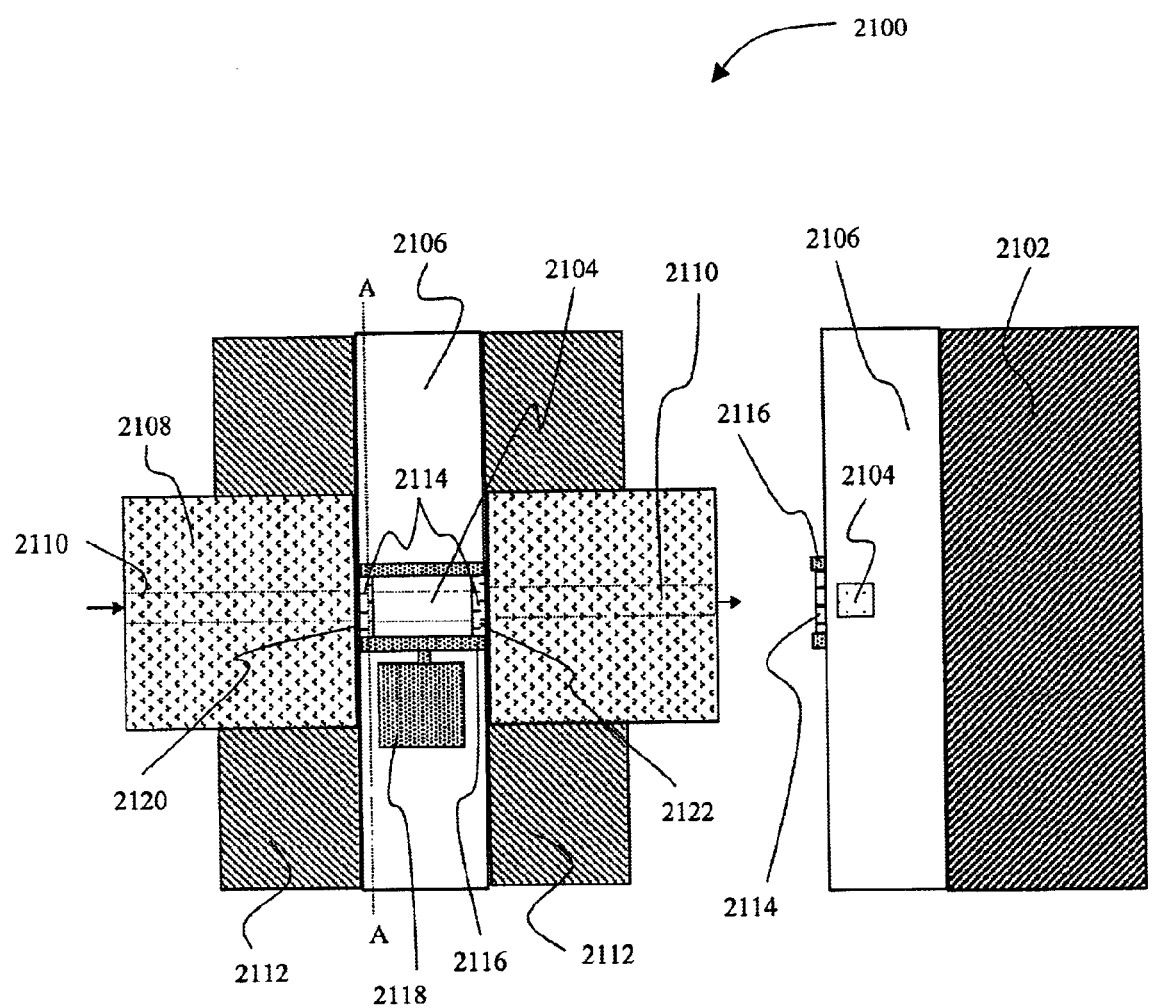
FIGS. 21a and 21b present a top plan view and a cross-sectional view, respectively, of a polymeric waveguide VOA employing hybrid material interfaces to improve transition losses.

FIGS. 21a and 21b present an embodiment of the invention making use of hybrid materials, wherein FIG. 21a is a top plan view and FIG. 21b is a cross-sectional view along line A—A of FIG. 21a. The waveguide is supported on a substrate. At the chip end faces the polymer waveguide channels, core 2104 and cladding 2106, are coupled to fused silica optical fibers having a fiber cladding 2108 and a fiber core 2110 by using Si—V groove units 2112. The thermo-optic coefficient of silica is opposite and an order of magnitude smaller than that of polymers. Therefore, by inducing a thermal gradient in the polymer at the end faces by applying heat with heaters 2114, an abrupt mode shifted transition between the polymer waveguides and the optical fibers is created. The heaters 2114 are connected via leads 2116 and bonded to the polymer cladding via bonding pads 2118. A refractive index gradient by thermal cross-talk in the fibers is of opposite sign and will enhance transition losses. It is noted, that this mode offset can be induced at the input 2120 and output ends 2122 of the polymer waveguide.

Figure 22A:
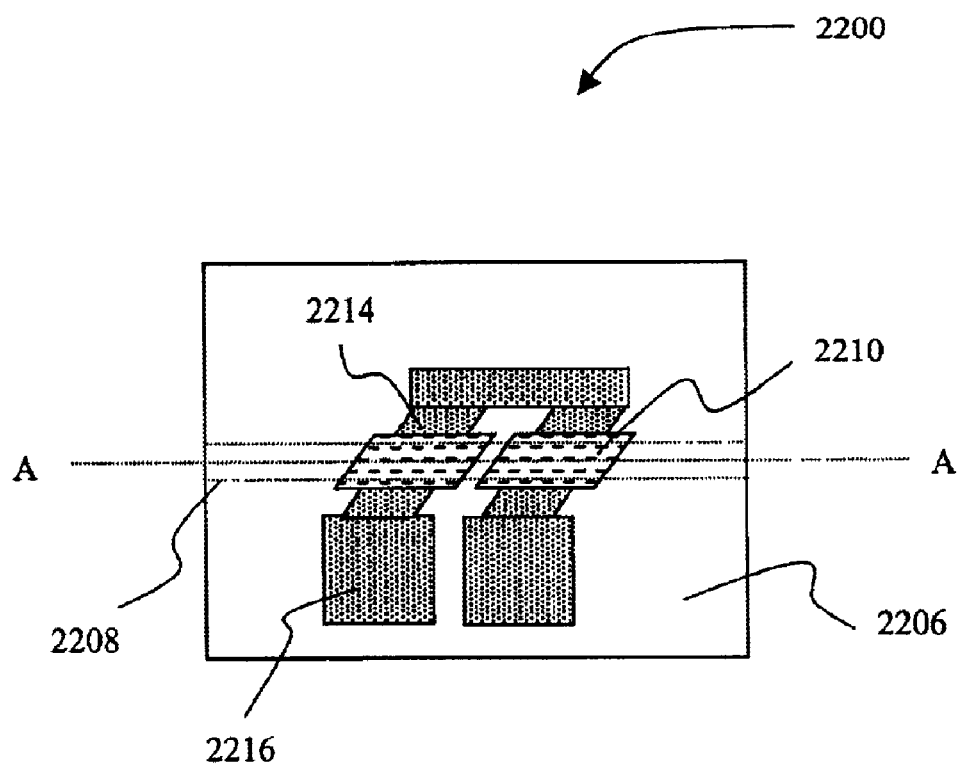
FIGS. 22a and 22b present a top plan view and a cross-sectional view, respectively, of another embodiment of a polymeric waveguide VOA employing hybrid material interfaces and cascading to improve transition losses.
Figure 22B:
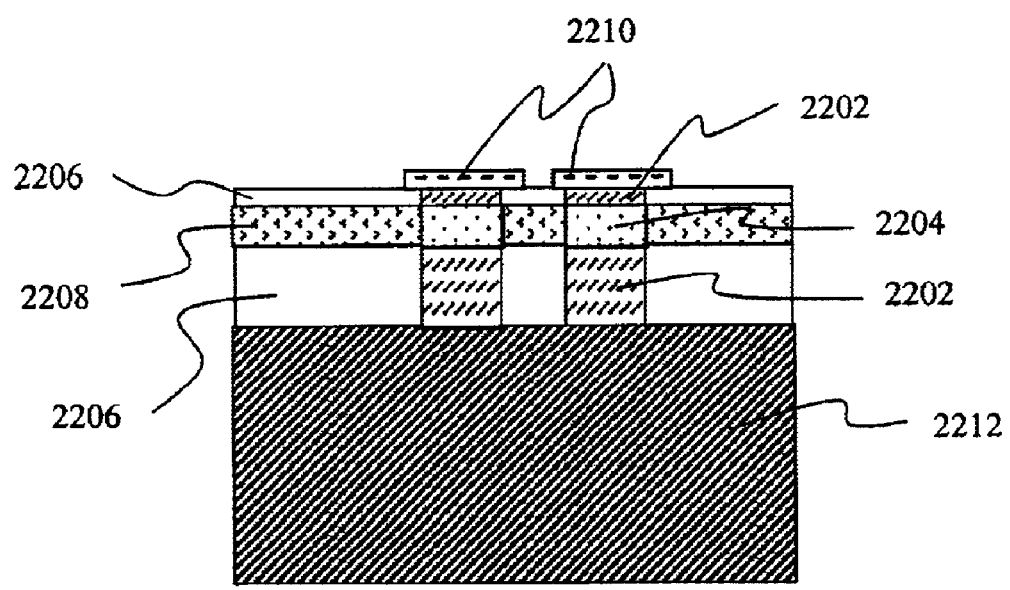

FIGS. 22a and 22b present yet a further embodiment of the present invention using hybrid material interfaces to enhance transition losses, wherein FIG. 22a shows a top plan view of the inventive VOA 2200 and FIG. 22b shows a cross-sectional view along line A—A of FIG. 22a. The VOA embodiment presented in FIG. 22a uses cascaded hybrid material interfaces. This is realized by grafting polymer waveguide sections including a polymer cladding 2202 and a polymer core 2204 into silica waveguides having a silica cladding 2206 and a silica core 2208 supported upon a substrate 2212. The heater elements 2210 are positioned above the polymer waveguide sections which are more susceptible to heat. The heater elements 2210 are connected via leads 2214 and bonded to the waveguide via bonding pads 2216. Silica has a low dn/dT and hence steep mode field mismatches or changes are generated causing transition losses between heated and unheated regions which in turn yield attenuation and low PDL.

Figures 23A, 23B:
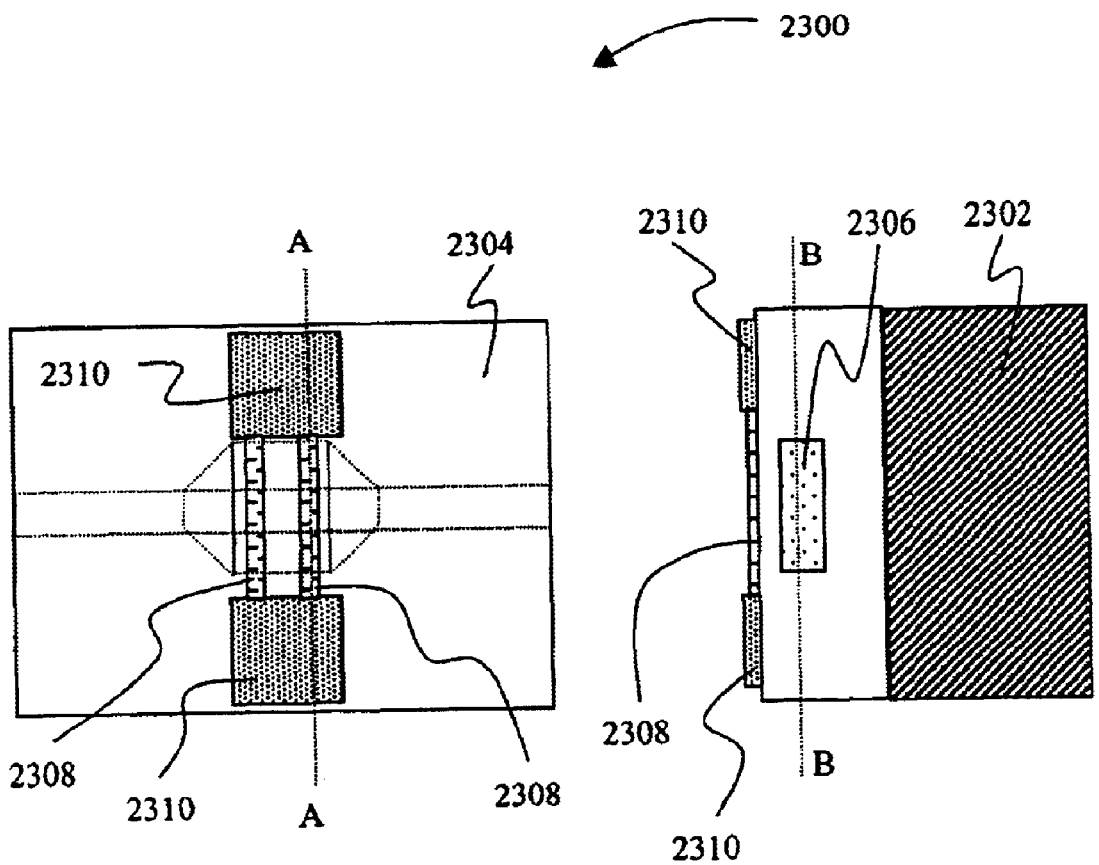
FIGS. 23a, 23b, and 23c present a top plan view and two cross-sectional view, respectively, of a polymeric waveguide VOA employing uptapered polymeric waveguides and cascading to improve transition losses.
Figure 23C:
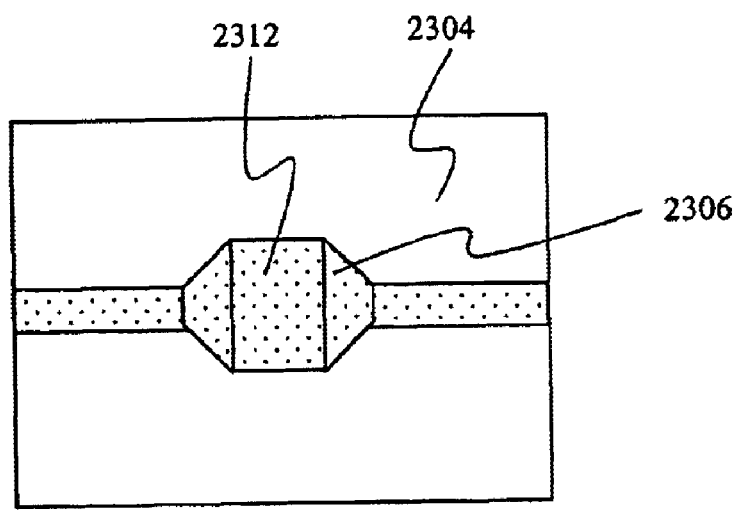

FIGS. 23a to 23c show an embodiment of an inventive VOA wherein up-tapered waveguides are employed to increase the transition losses between heated and unheated regions along a longitudinal direction in the waveguide. FIG. 23a presents a top plan view of the up-tapered waveguide embodiment, FIG. 23b presents a cross-sectional view along line A—A of FIG. 23a, and FIG. 23c presents a cross-sectional view along line B—B of FIG. 23b. As can be seen from FIG. 23b, a polymer waveguide is supported on a substrate 2302. The polymer waveguide has a cladding 2304 and a core 2306. FIG. 23c clearly shows the up-tapered portion of the polymer core 2306. In accordance with this embodiment of the present invention, a strong sensitivity of the transition loss for mode size is exploited. The lateral mode size is locally expanded by using tapers. In the expanded section, thermal gradients can be induced with heaters 2308, thus generating enhanced transition losses. The heaters 2308 are provided above the expanded section 2312 of the waveguide onto the polymer cladding 2304 and bonded thereto via bonding pads 2310.

In accordance with yet another embodiment of the present invention, the heater elements can be made, for example, by depositing a thin film of a metal onto the waveguide. Since these heaters create an abrupt refractive index change, it is advantageous to provide the heaters with an angle so as to reduce back-reflection, as can be seen for example in FIGS. 20a and 22a where the heater elements 2002 and 2210, respectively, are provided at an appropriate angle with respect to the waveguide.

Examples of polymers to be used in accordance with the present invention include low Tg (rubber) UV-crosslinkable, partially halogenated acrylate system with appropriate thermo-optic coefficients.

Advantageously, variable optical attenuators in accordance with the present invention show a good transparency over the C-band.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. A variable optical attenuator comprising:

a substrate;

a polymeric waveguide having a core surrounded by a cladding, the waveguide being supported on the substrate;

at least two refractive index varying means disposed in-line and spaced apart on an external surface of the waveguide along a propagation direction of an optical signal passing through the waveguide for generating a substantially localized refractive index gradient; and a controller for controlling the refractive index varying means for providing a predetermined attenuation to the optical signal;

such that the optical signal propagating through the waveguide passes through a plurality of substantially localized varying refractive index regions for generating a transition loss to attenuate the optical signal by causing a shift of a mode field of the optical signal;

wherein the refractive index varying means are temperature varying means for generating a substantially localized temperature gradient to produce the substantially localized refractive index gradient; and wherein the temperature varying means comprises laterally tapered temperature varying means extending across the waveguide for changing the mode field of the optical signal in a lateral and transverse direction to the propagation direction of the waveguide to reduce a polarization dependent loss.

2. The variable optical attenuator as defined in claim 1, wherein the substrate is a heat absorbing material.

3. The variable optical attenuator as defined in claim 2, wherein the temperature varying means comprises at least one of heating means controlled by the controller.

4. The variable optical attenuator as defined in claim 3 further comprising a sensor for sensing a temperature of the waveguide.

5. The variable optical attenuator as defined in claim 4, wherein the controller comprises a temperature controller for controlling the temperature varying means in dependence upon the sensed temperature of the waveguide.

6. The variable optical attenuator as defined in claim 3 wherein the temperature varying means and the waveguide define an angle therebetween for reducing back reflection.

7. The variable optical attenuator as defined in claim 2, further comprising a secondary waveguide having a secondary core and a secondary cladding adjacent to the core and the cladding of the polymeric waveguide, respectively, for reducing a refractive index difference between the core and the cladding to facilitate the shift of the mode field.

8. The variable optical attenuator as defined in claim 7 wherein a refractive index of the secondary waveguide is smaller than a refractive index of the core of the polymeric waveguide.

9. The variable optical attenuator as defined in claim 8 wherein a width and a height of the secondary waveguide are preselected for yielding a predetermined polarization dependent loss.

10. The variable optical attenuator as defined in claim 7, wherein the secondary waveguide is one of a secondary polymeric waveguide and a silica waveguide, wherein the secondary waveguide has a thermo-optic coefficient different than that of the polymeric waveguide.

11. The variable optical attenuator as defined in claim 1 further comprising a tap and feedback circuit in communication with the at least two refractive index varying means for at least one of monitoring and controlling an attenuation of the variable optical attenuator.

12. The variable optical attenuator as defined in claim 1 wherein the polymeric waveguide is interspersed with at least one section of a silica waveguide between or substantially near at least one of the two refractive index varying means for increasing the substantially localized refractive index gradient.

13. The variable optical attenuator as defined in claim 1 wherein the polymeric waveguide has an input end and an output end, said input and output ends being optically coupled to an optical fiber, wherein one of said at least two refractive index varying means is disposed substantially at the input end and the other one of said at least two refractive index varying means is disposed substantially at the output end for inducing the substantially localized refractive index gradient at the input and output ends for attenuating an optical signal passing through said section.

14. The variable optical attenuator as defined in claim 1, wherein a portion of the polymeric waveguide in which at least one of the substantially localized varying refractive index regions is induced, comprises an expanded waveguide section and a tapered waveguide section for expanding the mode field to increase the transition loss of the optical signal; wherein one of the refractive index varying means is positioned above the expanded waveguide section.

15. The variable optical attenuator as defined in claim 1 comprising more than two refractive index varying means, wherein a number of refractive index varying means is predetermined in dependence upon a predetermined degree of attenuation of the optical signal generated by each one of the number of refractive index varying means.

16. The variable optical attenuator as defined in claim 1 wherein the polymeric waveguide is an array of polymeric waveguides.

17. The variable optical attenuator as defined in claim 1 wherein a difference of the refractive index gradient is responsive to a variable control parameter of the at least two refractive index varying means and further comprising control means for selectively applying the control parameter.

18. The variable optical attenuator as defined in claim 17 wherein the control parameter is a voltage supplied to the at least two refractive index varying means.

19. The variable optical attenuator comprising:
a substrate;
a polymeric waveguide having a core surrounded by a cladding, the waveguide being supported on the substrate; and
at least two temperature varying means disposed in-line and spaced apart on an external surface of the waveguide along a propagation direction of an optical signal passing through the waveguide for generating a substantially localized temperature gradient to produce a substantially localized refractive index gradient;
at least one air gap in the polymeric waveguide disposed substantially near at least one of the at least two temperature varying means for increasing the substantially localized temperature gradient;
such that the optical signal propagating through the waveguide passes through a plurality of substantially localized varying refractive index regions for generating a transition loss to attenuate the optical signal by causing a shift of a mode field of the optical signal.

20. The variable optical attenuator as defined in claim 19 wherein the at least one air gap is disposed between the at least two temperature varying means.

21. The variable optical attenuator as defined in claim 19 wherein a dimension of the at least one air gap is chosen such as to avoid substantial diffraction losses of the optical signal.

* * * * *

UNITED STATES PATENT AND TRADEMARK OFFICE
CERTIFICATE OF CORRECTION

PATENT NO. : 6,870,998 B2
APPLICATION NO. : 10/132105
DATED : March 22, 2005
INVENTOR(S) : Diemeer et al.

It is certified that error appears in the above-identified patent and that said Letters Patent is hereby corrected as shown below:

Col. 12, line 55 "one of" should read -- at least three --

Signed and Sealed this

Eighteenth Day of July, 2006

JON W. DUDAS
*Director of the United States Patent and Trademark Office*